UNITED STATES PATENT OFFICE.

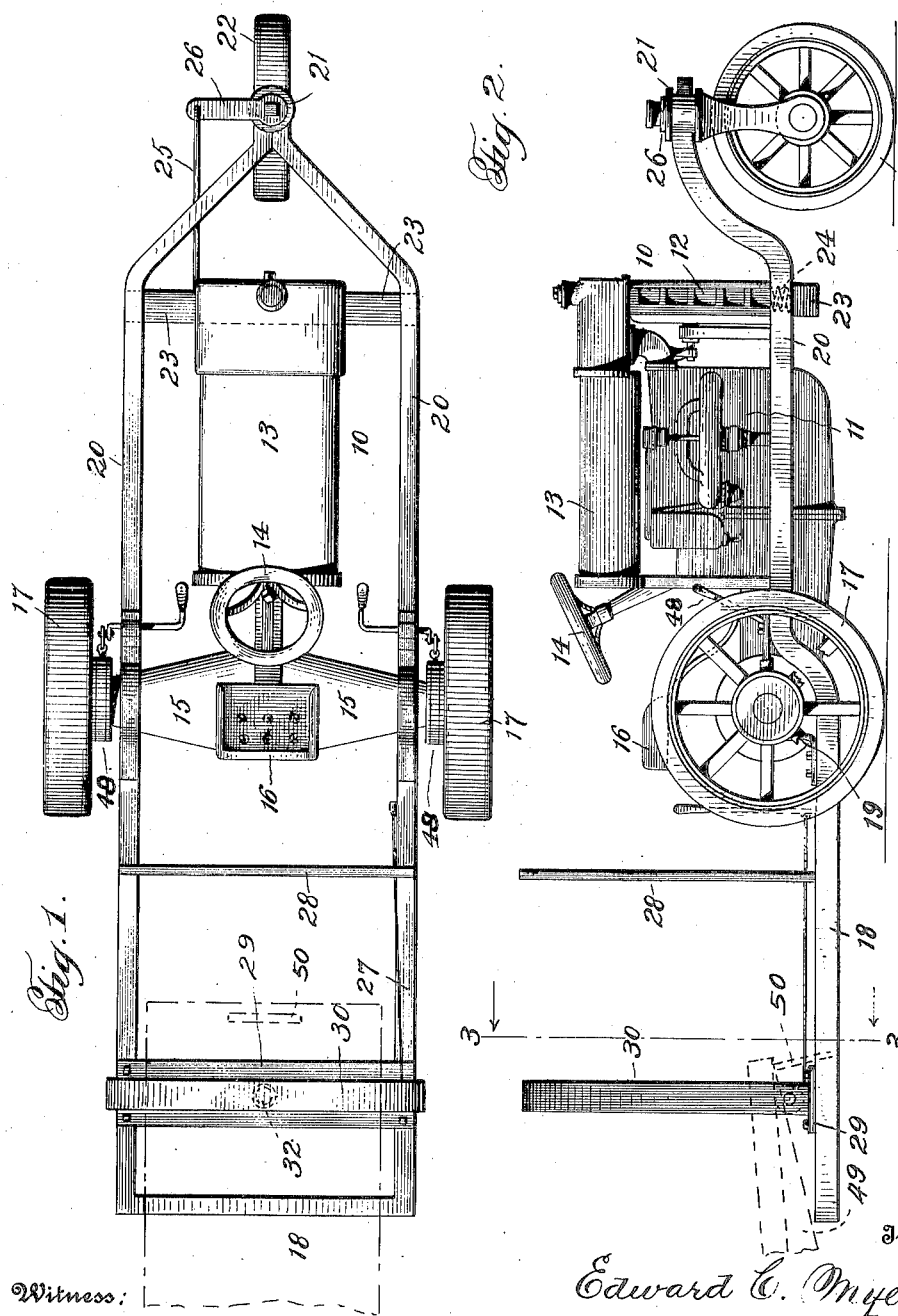

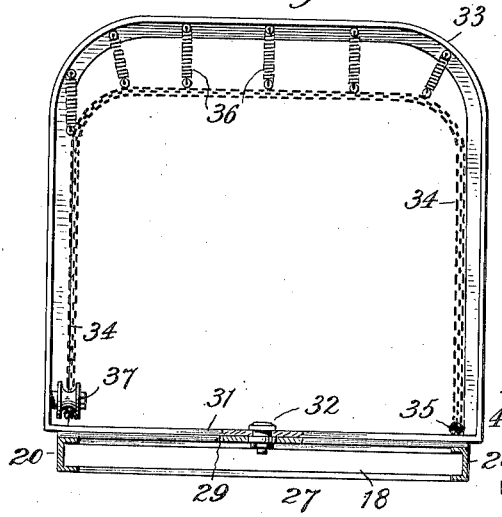
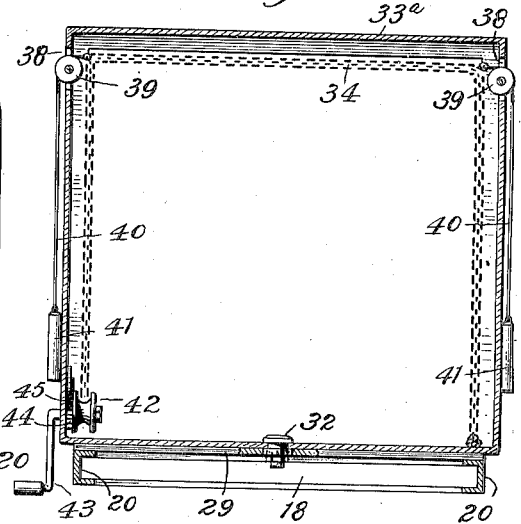
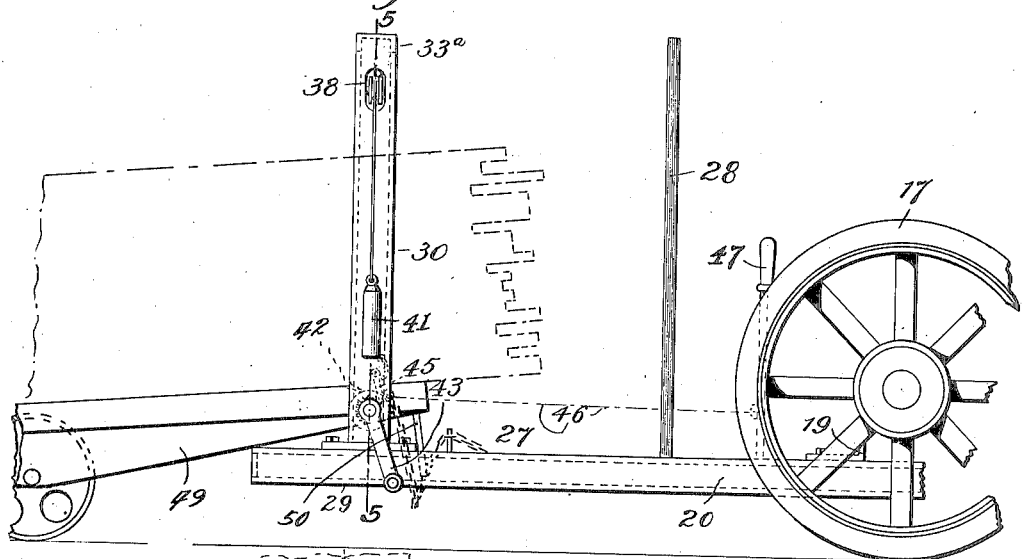
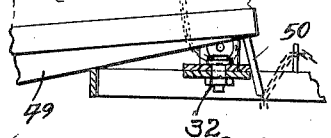

EDWARD C. MYERS, OF SEATTLE, WASHINGTON.

TRACTOR.

1,399,570.   Specification of Letters Patent.   Patented Dec. 6, 1921.

Application filed July 6, 1920. Serial No. 394,336.

*To all whom it may concern:*

Be it known that I, EDWARD C. MYERS, a citizen of the United States, residing at Seattle, in the county of King and State of Washington, have invented certain new and useful Improvements in Tractors, of which the following is a specification.

This invention relates to tractors, and particularly to industrial or lumber tractors.

The main object of the invention is to provide a special frame structure forming a body frame which can be attached to existing types of tractors without altering their construction, for the purpose of converting such tractors into industrial trucks.

Further objects and details of the invention will appear as described in connection with the accompanying drawings and hereinafter set forth and claimed.

Referring to the drawings forming a part of this specification, like numerals of reference designate corresponding parts throughout the several views, in which—

Figure 1 is a plan view of a tractor having a frame attached thereto, for converting it into an industrial truck in accordance with the invention, Fig. 2 is a side elevation thereof, Fig. 3 is an enlarged sectional view taken on the line 3—3 of Fig. 2, Fig. 4 is an enlarged side elevation of the rear end of a slightly modified form of lumber rack, Fig. 5 is a section on line 5—5 of Fig. 4, and Fig. 6 is a detail view.

Referring to the drawings the tractor illustrated is one of the small types of tractors propelled by an internal combustion engine, which is generally designated by reference numeral 10. The main parts of the tractor disclosed are the engine, 11, radiator, 12, fuel tank, 13, steering column and wheel, 14, differential and rear axle housing, 15, and seat for the driver, 16.

The original rear wheels of the tractor are replaced by rubber tired truck wheels, 17, as shown, and the front axle and wheels are removed. A body frame, 18, of channel iron, is suspended from the rear axle housing by strap irons, 19, passing over it and bolted to the frame. The side members, 20, of the frame extend beyond the front end of the tractor and carry a journal, 21, for a front wheel, 22. A cross bar, 23, connecting the two side members, 20, passes under the front end of the tractor and takes the place of the front axle, springs 24, being placed between the cross bar and tractor for suitably supporting the front end of the tractor. The steering link, 25, is connected with the steering arm, 26, on the front wheel, and with the tractor steering column in the usual manner.

The rear extensions of the side members, 20, of the frame, 18, form the supporting frame, 27, for the truck. A shield, 28, such as a piece of boiler plate is mounted on the truck frame, crosswise thereof, adjacent the driver's seat, 16, forming a front end for the truck, and protection for the driver, by preventing the load on the frame from hitting him.

A cross piece, 29, is fastened to the side members, 20, and forms a support for a lumber binder rack, 30. The lumber binder rack comprises a bar, 31, pivoted at 32 to the cross member, 29, and provided with a channel member, 33, extending above it, forming a rack for lumber placed on the truck. A log chain, 34, is fastened to the rack at one end, 35, as by means of a swivel, and extends upwardly adjacent to the top of the rack where it is supported by a number of tension springs, 36, and from there it extends down the other side of the rack under a pulley or drum, 37.

In the modified form of lumber rack illustrated in Figs. 4 and 5, the upper part, 33ª, of the rack is slotted at 38, and pulleys, 39, are journaled therein. The chain, 34, in this form of the rack is supported by small wire cables, 40, fastened to it and passing over the pulleys, 39. Weights, 41, on the ends of the cables maintain the chain adjacent to the top of the rack. The drum, 42, is provided with a winding crank, 43, for drawing the chain down tight upon lumber placed in the rack. A ratchet wheel, 44, fastened to the drum, and a spring pressed pawl, 45, retain the drum for holding the chain in position upon the lumber. A cord or cable, 46, is fastened to the lever, 47, mounted on the frame, 20, adjacent to the driver's seat. When it is desired to release the lumber from the rack the driver may pull upon the lever, 47, so as to release the drum and allow the chain to unwind, and be taken up by the weights, 41, so it will not be necessary for the driver to leave his seat.

A tractor converted into a truck in this manner and provided with three wheels has a short turning radius and the rear wheels may each be equipped with separate brakes, 48, to facilitate turning.

The tractor is especially adapted for hauling lumber loaded on "dollies" which are in general use in lumber mills. The "dolly," a portion of which is shown at 49, is supported on the pivoted bar 31, by backing the tractor under the front of it which always tips up as the rear end is built to balance in this way. With the hook, 50, across the lumber rack, the chain, 34, is then drawn down upon the lumber to clamp it with the "dolly" in the rack. Thus the "dolly" with its load is securely fastened to the frame, 27, and the pivot, 32, for the rack makes turning with it as a trailer possible.

I do not limit myself to any specific constructions as described in this specification for the purpose of giving examples or illustrations of my invention, for it is obvious that various changes in the details may be resorted to without departing from the spirit and scope of the invention, which is set forth in the following claims:

1. In an industrial or lumber tractor, comprising a tractor power plant and rear axle and differential housing with suitable wheels mounted on the rear axles, a truck frame supported by the rear axle and differential housing and extending forwardly and to the rear thereof, means for supporting the forward portion of said frame, means for supporting the front end of the tractor power plant from said frame, and load carrying means mounted on said rearwardly extending portion of the frame.

2. In an industrial or lumber tractor, comprising a tractor power plant and rear axle and differential housing with suitable wheels mounted on the rear axles, a truck frame supported by the rear axle and differential housing and extending forwardly and to the rear thereof, means for supporting the forward portion of said frame, means for supporting the front end of the tractor power plant from said frame, a protector plate mounted across the frame to the rear of said axle housing for limiting the extent to which the frame can be loaded, and a lumber rack on the load carrying portion of the frame, for holding lumber placed thereon.

3. In an industrial or lumber tractor, comprising a tractor power plant and rear axle housing carried on suitable wheels, a truck frame supported by the rear axle housing and extending to the rear thereof, a cross piece mounted near the rear end of the frame, a lumber rack mounted on said cross piece comprising an open frame pivoted to said cross piece, a flexible member held in said open frame, and means for drawing upon the flexible member for binding lumber placed in the rack.

4. In an industrial or lumber tractor, comprising a tractor power plant and rear axle housing carried on suitable wheels, a truck frame supported by the rear axle housing and extending to the rear thereof, a cross piece mounted near the rear end of the frame, a lumber rack mounted on said cross piece comprising an open frame pivoted to said cross piece, a flexible member held in said open frame, means for drawing upon the flexible member for binding lumber placed in the rack, and means adjacent to the driver's seat for releasing said flexible member from binding lumber in the rack.

5. An industrial tractor comprising a tractor power plant and rear axle and differential housing with suitable wheels mounted on the rear axles, a truck frame having side members supported by said rear axle and differential housing and extending beyond the front end of the tractor power plant, means on said side members for supporting the front end of the tractor power plant, a journal carried by the front ends of said side members, a wheel for supporting the frame mounted in said journal, and means for turning said wheel with the tractor steering mechanism.

6. An industrial tractor comprising a tractor power plant and rear axle and differential housing with suitable wheels mounted on the rear axles, a truck frame having side members supported by said rear axle and differential housing and extending beyond the front end of the tractor power plant, a cross member connecting said side members, springs positioned on said cross member forming the support for the front end of the tractor power plant, and a front wheel with suitable mountings for supporting the front ends of said side members.

7. A lumber truck frame carrying a binder rack comprising an open frame, a binding flexible member for lumber placed in the rack having one end fastened to said open frame at one side thereof and the other end passing around a pulley or drum at the other side of the frame, and means in the top of the frame for supporting said flexible member in an elevated position for the purpose set forth.

8. A lumber truck frame carrying a binder rack comprising an open frame, a binding flexible member for lumber placed in the rack having one end fastened to said open frame at one side thereof and the other end passing around a pulley or drum at the other side of the frame, pulleys positioned in slots in the sides of the open frame adjacent to the top thereof, cables attached to said flexible member and passing over said pulleys, and weights on the ends of said cable for supporting said flexible member for the purpose set forth.

9. A lumber truck frame carrying a binder rack comprising an open frame, a binding flexible member for lumber placed in the rack having one end fastened to said open frame at one side thereof and the other end passing around a pulley or drum at the other side of the frame, means for supporting said flexible member in the upper part of the open frame, a crank for turning said pulley for drawing upon the flexible member, a ratchet wheel on the pulley, and a pawl for holding the ratchet wheel and pulley from turning for releasing the flexible member.

10. In combination with a tractor whose engine and transmission casing and rear axle housings constitute its frame, a cross frame member on said rearwardly extending members, a lumber rack on said cross member, means for binding lumber in said rack, and means extending from said rack to a position adjacent to the tractor seat for releasing said binding means.

11. An industrial tractor comprising a tractor power plant rear driving axle and differential housing therefor, wheels on said driving axles for supporting the tractor, a frame supported by the rear axle and differential housing and extending along the sides of the tractor, means for supporting the front end of the tractor power plant by said frame, and a wheel for guiding the tractor and supporting the front end of the frame.

12. A frame structure for attachment with tractors comprising a frame having members thereof for extending along the sides of the tractor, means for supporting the front end of said frame, a cross piece extending under the front end of the tractor for supporting it and having its ends fastened to said side frame members, and means for supporting said members from the rear end of the tractor.

13. In combination, a frame structure having a front guiding wheel, means for supporting the front end of a tractor with its front wheels removed from said frame, means for supporting said frame from the rear of the tractor, and connections between the steering mechanism of the tractor and said guiding wheel.

14. A frame structure for attachment with tractors comprising a frame having members thereof for extending along the sides of the tractor and under its rear axle housing, means for supporting the front end of said frame, means for supporting the front end of the tractor with its front wheels removed from said frame, and clamps fastened to said members and said rear axle housing for supporting them from the rear end of the tractor.

15. A frame structure for attachment with tractors comprising a frame having members thereof for extending along the sides of the tractor, means for supporting the front end of said frame, means for supporting the front end of the tractor by said frame members, and means for supporting said frame members from the rear end of the tractor.

16. In combination with a tractor whose engine and transmission casing and rear axle housings constitute its frame, a frame structure for converting the tractor into an industrial truck including a pair of side members adapted to be fastened to the front end of the tractor and to the rear axle housings thereof and extend rearwardly therefrom, and a load supporting platform member fastened to the rearwardly extending portions of said side frame members.

17. A frame structure for attachment with a tractor whose engine and transmission casing and rear axle housings constitute its frame comprising a frame having side members thereof for extending along the sides of a tractor and rearwardly thereof, means for fastening said side frame members to the front end and to the rear axle housings of the tractor, a suitable cross piece fastened to the side frame members toward their rear ends, a shield or baffle member fastened cross-wise on the rearwardly extending portion of said side frame members, and means for fastening a lumber truck to said cross piece and for securely binding lumber on the truck in position for hauling.

18. In combination with a tractor whose engine and transmission casing and rear axle housings constitute its frame, a frame including side members attached to the front end of the tractor and to its rear axle housings and extending to the rear thereof, a platform on said rearwardly extending side members, a lumber rack on said platform, means for binding lumber in said rack, means for retaining said binding means in engagement with the lumber in said rack, and means for releasing said binder retaining means extending therefrom to a position adjacent to the tractor seat for releasing said binding means.

19. A supporting frame for attachment with tractors comprising a frame having members thereof for extending along the sides of the tractor, means for supporting the front end of said frame, a cross piece extending under the front end of the tractor for supporting it and having its ends fastened to said side frame members, means for fastening said members to the rear end of the tractor, and a second cross piece having its ends connected to said side frame members to the rear of the tractor.

In testimony whereof I affix my signature.

EDWARD C. MYERS.